Oct. 21, 1924.

W. H. HENDRICKSON

ALTITUDE OXYGEN APPARATUS

Filed March 28, 1919   10 Sheets-Sheet 2

W. H. HENDRICKSON

ALTITUDE OXYGEN APPARATUS

Filed March 28, 1919   10 Sheets-Sheet 4

Witnesses:
W. F. Kilroy
Harry R. White

Inventor:
Walter H. Hendrickson,
By John Howard McElroy
his Atty.

Oct. 21, 1924.

W. H. HENDRICKSON 1,512,022

ALTITUDE OXYGEN APPARATUS

Filed March 28, 1919 10 Sheets-Sheet 5

Witnesses:
W. F. Kilroy
Harry R. L. White

Inventor:
Walter H. Hendrickson,
By John Howard McElroy
his Atty

Oct. 21, 1924.

W. H. HENDRICKSON

ALTITUDE OXYGEN APPARATUS

Filed March 28, 1919    10 Sheets-Sheet 6

1,512,022

Oct. 21, 1924. 1,512,022
W. H. HENDRICKSON
ALTITUDE OXYGEN APPARATUS
Filed March 28, 1919 10 Sheets-Sheet 8

Patented Oct. 21, 1924.

1,512,022

UNITED STATES PATENT OFFICE.

WALTER H. HENDRICKSON, OF CHICAGO, ILLINOIS, ASSIGNOR TO A. C. CLARK & COMPANY, OF CHICAGO, ILLINOIS, A CORPORATION OF ILLINOIS.

ALTITUDE OXYGEN APPARATUS.

Application filed March 28, 1919. Serial No. 285,854.

*To all whom it may concern:*

Be it known that I, WALTER H. HENDRICKSON, a citizen of the United States, and a resident of Chicago, in the county of Cook and State of Illinois, have invented certain new and useful Improvements in Altitude Oxygen Apparatus, of which the following is a full, clear, and exact specification.

My invention is concerned with apparatus for administering gases, and more especially with apparatus for supplying oxygen gas to aviators and others at varying altitudes so that it supplies a constantly increasing quantity as the aviator ascends to high altitudes, thus automatically compensating for the increased rarefaction of the air and the consequently diminishing quantity of oxygen therein, so that the aviator breathes with equal freedom at all altitudes, and it is designed to produce such an apparatus as will operate certainly and accurately under all extremes of temperature and altitudes, and in all positions which it may occupy owing to the possibly inverted and other abnormal positions the aeroplane may occupy.

It is also concerned with certain other improvements in such apparatus of the same general character, and the various features thereof will be fully described in the body of the specification and the novel features and combinations particularly pointed out in the claims.

To illustrate my invention, I have annexed hereto ten sheets of drawings in which the same reference characters are used to designate identical parts in all the figures, of which—

Fig. 10 is a side elevation of the valve body just referred to;

Figure 30:
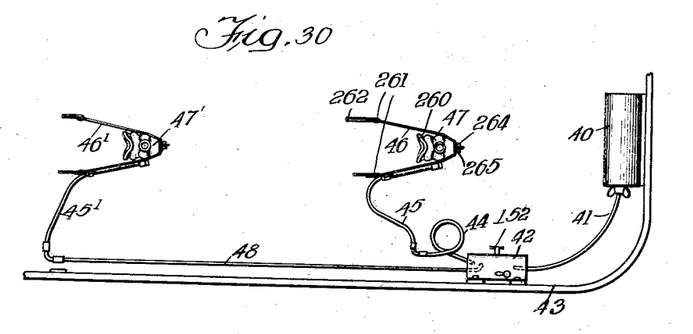
Fig. 30 is a diagrammatic plan view showing the complete outfit of the parts in their relative positions.
Figure 31:
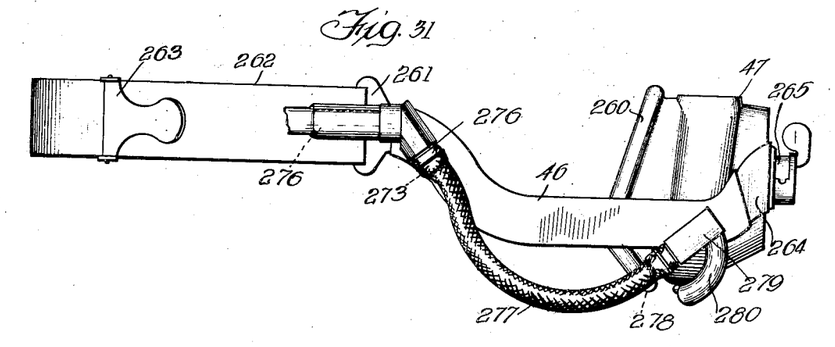
Fig. 31 is a side elevation of the novel inhaler.
Figure 32:
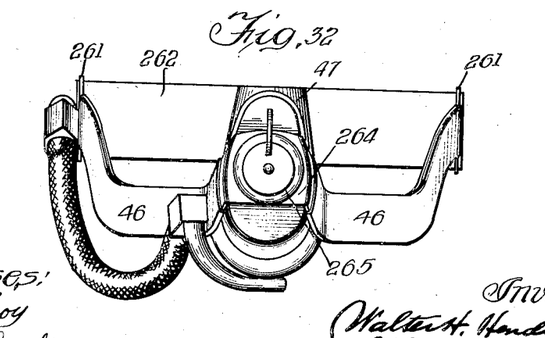
Fig. 32 is a front elevation of the same.
Figure 33:
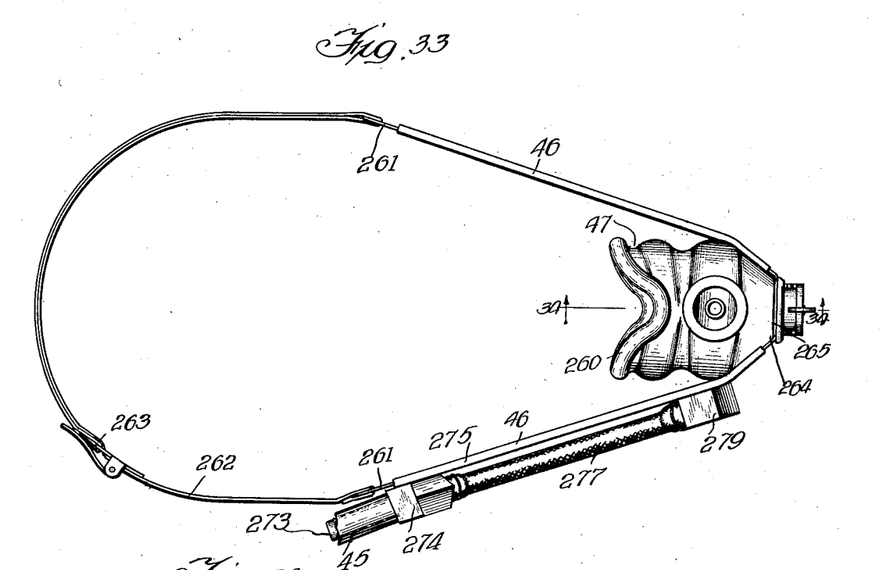
Fig. 33 is a top plan of the same.
Figures 34, 35, 36:
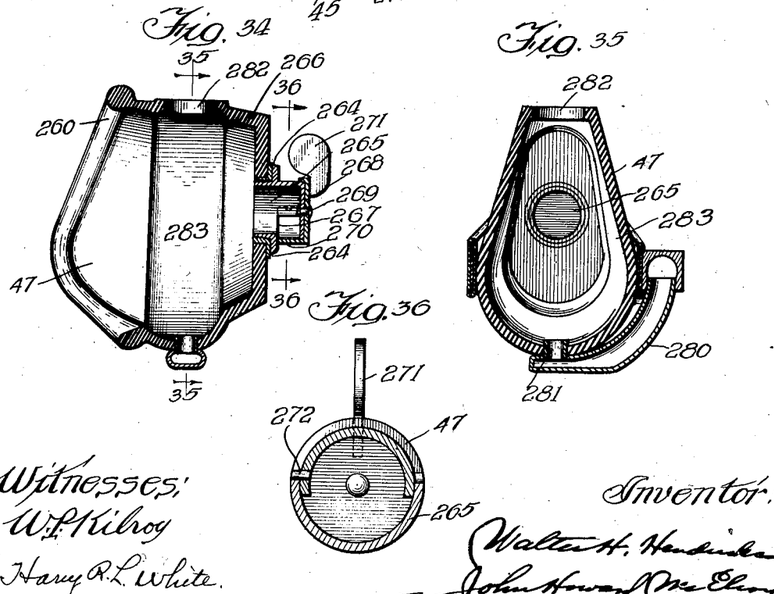
Fig. 34 is a detail in section on the line 34—34 of Fig. 33, but on a larger scale.
Figs. 35 and 36 are details in cross section on lines 35—35 and 36—36 of Fig. 34.

The complete outfit with the parts connected up is shown diagrammatically in Fig. 30, where 40 is a tank containing compressed oxygen and suitably secured and supported in the fuselage of the aeroplane, and connected by the small copper pipe 41 having a very fine bore with the under side of the reducing and controlling mechanism 42, which is screwed to the side 43 of the fuselage where the dials are in sight of the aviator. Connected to one of the discharge nipples of the apparatus 42 is a tube 44, which is preferably suitably supported upon the fuselage, and the end of which is connected to the flexible but non-collapsible tube 45 which is secured to the supporting frame 46 of the inhaler 47 which is adapted to be secured upon the nose of the aviator, and the other end of the tube 45, as will be subsequently explained, is connected to the inhaler 47 so that the oxygen supply is fed to the aviator in connection with the air supply. Where a two-seated machine is employed, the second outlet nipple from the reducing and controlling apparatus 42 is connected by the rigid pipe 48 with a second tube 45' which in turn is connected to the second frame 46' supporting the second inhaler 47'.

Figure 4:
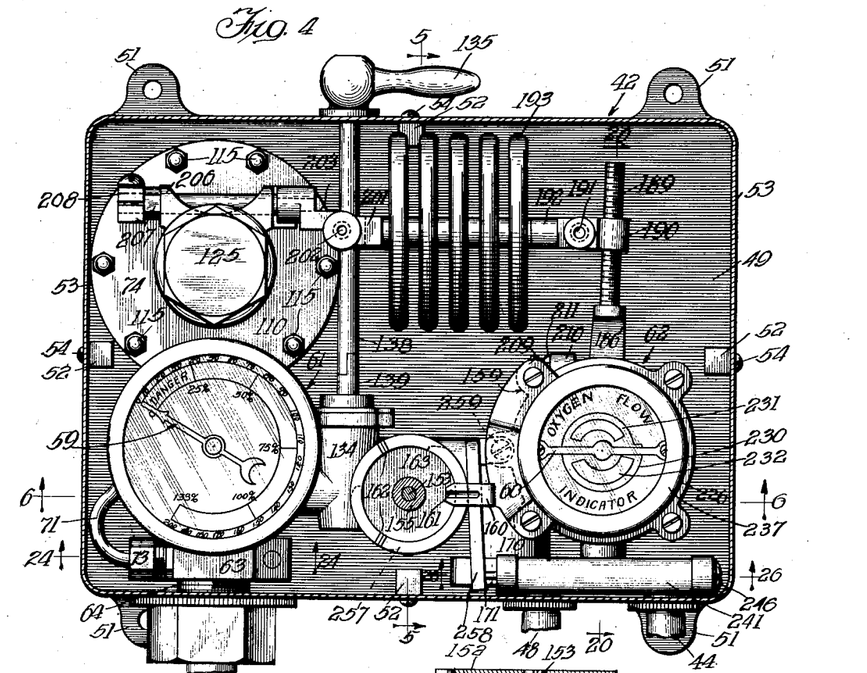
Fig. 4 is a side elevation of the same, but on an enlarged scale, and with the sides of the casing in section and with the top thereof removed.
Figure 12:
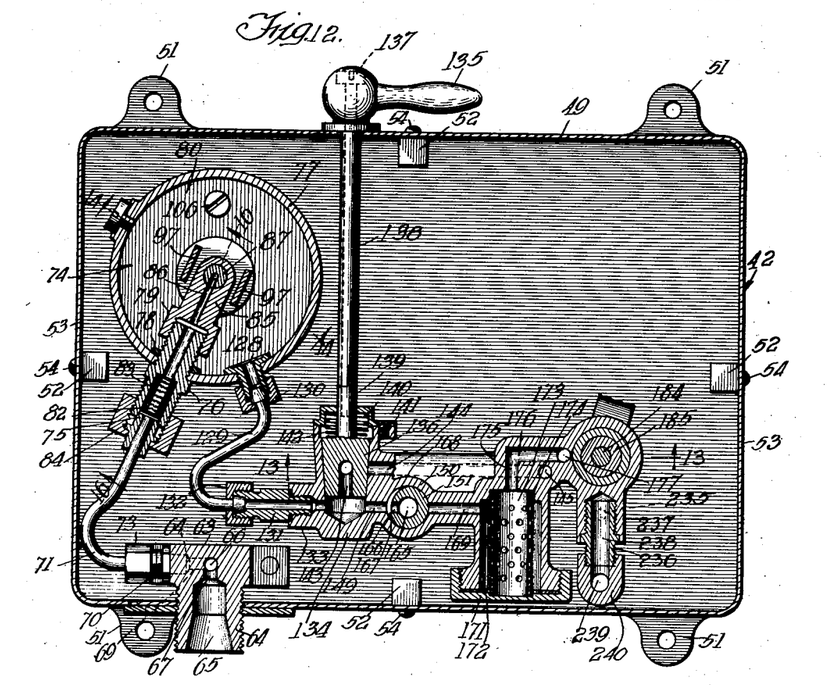
Fig. 12 is a vertical section on the line 12—12 of Fig. 6.
Figure 24:
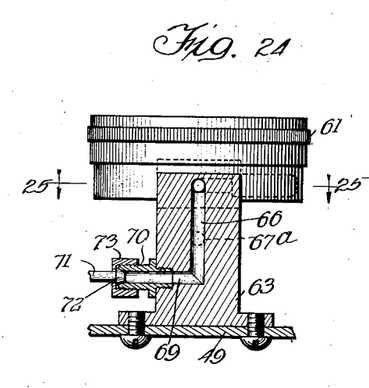
Fig. 24 is a detail in horizontal section, as seen on the line 24—24 of Fig. 4.
Figure 25:
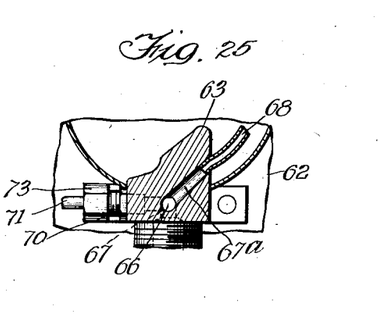
Fig. 25 is a detail in vertical section as seen on the line 25—25 of Fig. 24.

The oxygen is supplied in the tank 40 at a pressure ranging from 2200 pounds per square inch down, as the supply is used, and the compressed oxygen passes to the controller and reducing mechanism 42 through the tube 41. The casing of this apparatus 42 is made up of the cast base piece 49, the under side of which is preferably provided with strengthening ribs 50, and the edges of which are provided with a plurality of ears 51 through the apertures of which screws are passed to secure it to the side of the fuselage 43. The base is also provided on its upper surface with a plurality of lugs 52 at the centers of the sides, which lugs 52 are employed to secure the sides of the sheet metal casing 53 to the base by the screws 54 passing therethrough and threaded into the lugs 52. The top of the casing 53 is provided with the circular apertures 55 and 56 which are closed by the glasses 57 and 58 so that the indicators 59 and 60 of the pressure gauge 61 and the oxygen flow controller 62 are visible to the aviator. Secured on the lower left hand corner of the base 49 is a metal block 63 which has the externally threaded nipple 64 projecting outward and downward through a suitable aperture in the bottom of the casing 53, to which nipple is secured the connection for that end of the pipe 41. The nipple 64 has the tapering valve seat 65 for the connection, and a horizontal passage 66 therein is connected by the port 67 with the seat 65, and the outer end of the passage 66, as seen in Figs. 24 and 25, is connected by the passage 67$^a$ with the interior of the Bourdon tube 68 of the pressure gauge 61, which is of ordinary construction, and is supported upon the upper end of the block 63. The scale is graduated in any manner that may be desired, for instance in atmospheres, as seen in Fig. 4, it being, however, desirable to have the scale marked "Danger" for the lowest portion thereof to indicate to the aviator that when the pointer reaches the lower portion his supply of oxygen is practically exhausted and that he should descend, if possible, rather than to stay up at any considerable altitude. The passage 66 is also connected by the horizontal passage 69 with a nipple 70 secured in the side of the block 63 for the end of the small copper tube 71 having the tapered head 72 co-operating with the nipple and secured in place by the nut 73. This pipe 71 is curved as shown in Fig. 12, and carries the oxygen, still at its highest pressure, to the reducing valve mechanism 74, which is best seen in Figs. 14, 15 and 16. The pipe 71 has its other end provided with the nipple 75, which co-operates with the end of the connection nipple 76 which is passed through the side of the cylindrical casing 77 of the reducing valve and secured in place in said side by the nut 78. The threaded inner end of the connection nipple 76 is screwed into the block 79 extending outwardly from the generally circular base 80 of the reducing valve casing. The outer end 81 of the passage through the connection nipple 76 is enlarged, and to strain the oxygen before it passes to the reducing valve, and remove any possible impurities, I place in said enlarged portion 81 of the passage a plurality of very fine mesh wire screens 82, which screens in the form of disks and separating rings are preferably secured in the metallic capsule 83, so that they can be readily removed and replaced when they become dirty. The outer end of the connection nipple 76 is threaded and the nut 84 is employed to draw the ends of the nipples 75 and 76 together to make a gas-tight connection.

Figure 14:
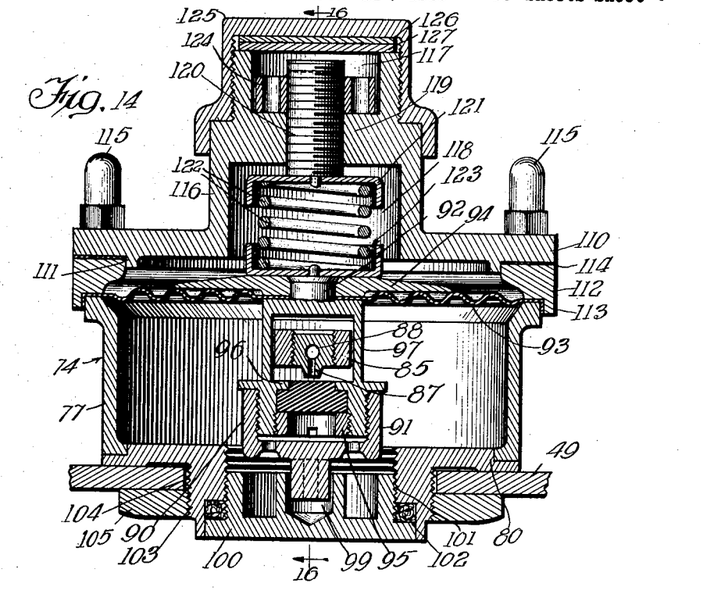
Fig. 14 is a substantially horizontal section on the lines 14—14 of Figs. 12 and 16, but on a still larger scale, the same scale as Fig. 16.
Figure 16:
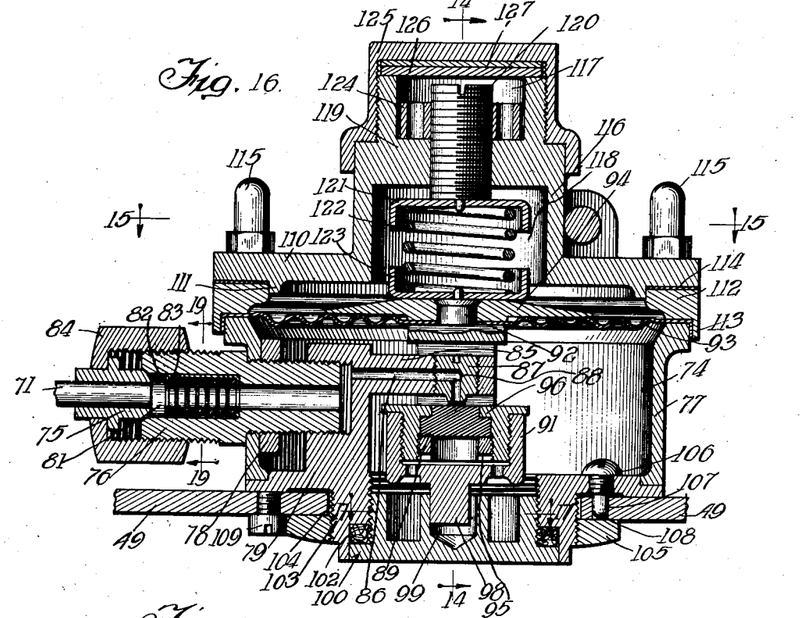
Fig. 16 is a substantially vertical section on the lines 16—16 of Figs. 12 and 14.
Figures 17, 18:
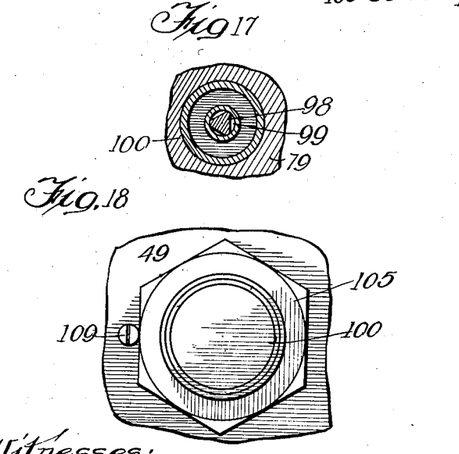
Fig. 17 is a detail in vertical section on the line 17—17 of Fig. 16, but on a reduced scale.
Fig. 18 is a detail as seen from the lower side of Fig. 17.
Figure 19:
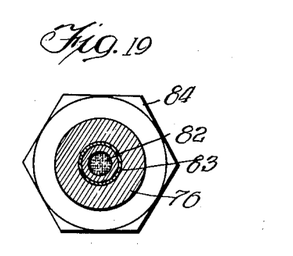
Fig. 19 is a substantially horizontal section as seen on the line 19—19 of Fig. 16.

The block 79 has the extension 85, best seen in Figs. 12 and 16, which has the passage 86 extending thereinto and terminating in the nipple 87, which is preferably threaded into the end of the extension, and has a right-angular passage 88 therethrough, the end of the nipple proper being adjacent to the co-operating surface of the block 89, which is preferably of bakelite, and which is held in position in the top of the holder 90, which forms the main or body portion of a yoke, the upper end of which has a stud 92 extending through the center of a corrugated metallic diaphragm 93 and secured to the disk 94 which extends out over the central portion of the diaphragm to reinforce the same. A nut 95 is screwed into the threaded under side of the passage through the holder 90 and presses the block 89 against the annular flange 96 formed on the inner edge of the top of the holder. The nipple 87, as best seen in Fig. 14, is located between the sides 97 of the yoke so that the yoke is free to rise and fall relative to the nipple as the center of the diaphragm 93 is moved up and down. To guide the bottom of the yoke, I screw on its bottom the cap 91 which has an extension 98, which is preferably triangular in cross section, and co-operates with the aperture 99, circular in cross section, formed in the center of the cap nut 100, which is screwed into the threaded aperture 101 formed in the bottom 80 of the reducing valve casing. Packing 102 is interposed between the flange formed at the edge of the cap nut, and the opposed flange in the bottom of the reducing valve casing to make the same airtight. The threaded lower annular portion 103 of the bottom 80 of the reducing valve casing extends through an aperture 104 in the base 49 and a nut 105 is employed to clamp the bottom 80 of the reducing valve casing securely upon the base 49 of the apparatus. The screw 106 threaded into the bottom 80 of the reducing valve casing has its projecting end 107 entering a recess 108 in the base 49 to properly position said base relative to its associated parts, and when the nut 105 is screwed up securing the reducing valve casing in place, a set screw 109 is screwed into the bottom of the casing 49 so as to lock the nut 105 from possibly turning.

The top of the reducing valve casing is formed by the cap disk 110, which has an inwardly projecting flange 111 co-operating with the inner edge of an annulus 112 interposed between it and the upper edge of the cylindrical side 77 of the reducing valve casing. The annulus 112 has an inwardly projecting flange 113 and the downwardly projecting edge of the diaphragm 93 is secured between the flange 113 and the adjacent edge of the top of the cylindrical side 77. A packing ring 114, which may be made of paraffin coated paper, is interposed between the outer edge of the top 110 and the top of the annulus 111, and the top of the casing is secured to the side by the cap screws 115 passing therethrough and into the edges of the side walls 77 so as to make the reducing valve casing air-tight. The top portion 110 is provided with the central circular projection 116, which has the openings 117 and 118 in the outer and inner ends thereof. The central web 119 of the extension has the set screw 120 threaded therethrough and co-operating with the shallow cup shaped disk 121 with which co-operates the outer end of the strong helically coiled expanding spring 122, the other end of which co-operates with the opposed cup shaped disk 123 secured on the top of the aforesaid disk 94. A lock nut 124 in the recess 117 serves to lock the setscrew 120 in any desired position, and the cap 125 screwed to the threaded upper end of the projection 116 with the interposed washers 126 and 127 serves to seal the interior.

It will be apparent that by adjusting the tension on the spring 122 by means of the set screw 120, an effective reducing valve is secured, as when the compressed gas entering the chamber of the reducing valve is strong enough, it will lift the diaphragm 93 against the tension of the spring 122 bringing the bakelite seat 89 against the nipple 88, and shutting off any further entrance of the compressed gas until the pressure in the chamber is very materially reduced, when the spring 122 will force the yoke down and thus open the valve. In this manner the oxygen may be supplied from this reducing valve at any desired pressure, which may range from 15 to 22 pounds per square inch, although I prefer to hold it at about 18 pounds per square inch.

The gas with the pressure thus reduced to 18 pounds per square inch, passes through the nipple 128 (see Fig. 12), into the connecting pipe 129, which is secured to the nipple by the nut 130, the nipple 128 being conveniently screwed through the wall 77 of the reducing valve. The other end of the pipe 129 is secured to the connection 131 by the nut 132, the connection 131 being screwed into the boss 133 of the full flow valve casing 134, which is a part of an irregular casting containing the bodies of the full flow valve, the men-control valve, and the controlling valve, all of which will be subsequently described, the casting being secured by screws to the base pate 49.

Figure 1:
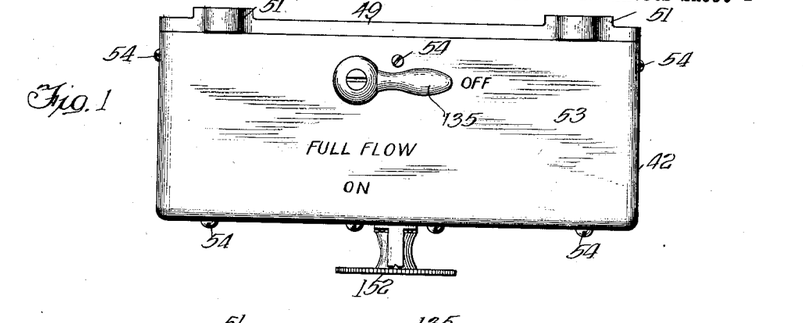
Fig. 1 is a top plan view of the reducing and controlling apparatus with the casing in place.
Figure 13:
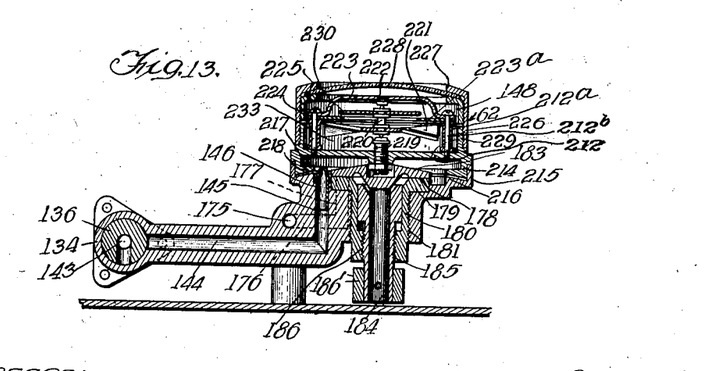
Fig. 13 is a horizontal section on the line 13—13 of Fig. 12.

The full flow valve (see Figs. 1 and 12), is controlled by the handle 135, located on the top of the casing, and secured to the truncated conical body 136 of the valve by the screw bolt 137, which is passed through the end of the handle 135 and through the elongated tubular extension 138, secured thereto and into the short stem 139 projecting upward from the valve body. A cap 140 secured on the top of the valve casing 134 by the screw 141 serves to hold the helically coiled expanding spring 142 compressed against the top of the valve 136 so that it will always be gas-tight. The valve body 136 has the right-angular passage 143 extending up through the bottom and at one side thereof, and in the "Off" position the passage 143 terminates against the solid wall of the casing 134. When the handle 135 is turned to the "Full flow" position, which is done when an abnormal supply of oxygen is needed, the side end of the passage 143 is brought into register with the adjacent end of the passage 144 which extends substantially through the length of the casting and has a portion 145 extending horizontally and outwardly at right angles to the main body of the passage and opening through the nipple 146 (see Figs. 13 and 20) into the chamber 147 located in the bottom of the controlling valve and flow indicator casing 148. The quantity of oxygen that can pass through this full flow passage 144 is practically unrestricted as compared with the restrictions caused by the action of the controlling valve to be subsequently explained, and it will be understood that in ordinary use the handle 135 is in the "Off" position, and the exact supply of the oxygen is regulated to care for the deficiency due to the altitude. When more oxygen is desired, the handle 135 is turned to the "Full flow" position, when an excess of oxygen is available through the by-pass thus described around the controlling valve.

Figure 2:
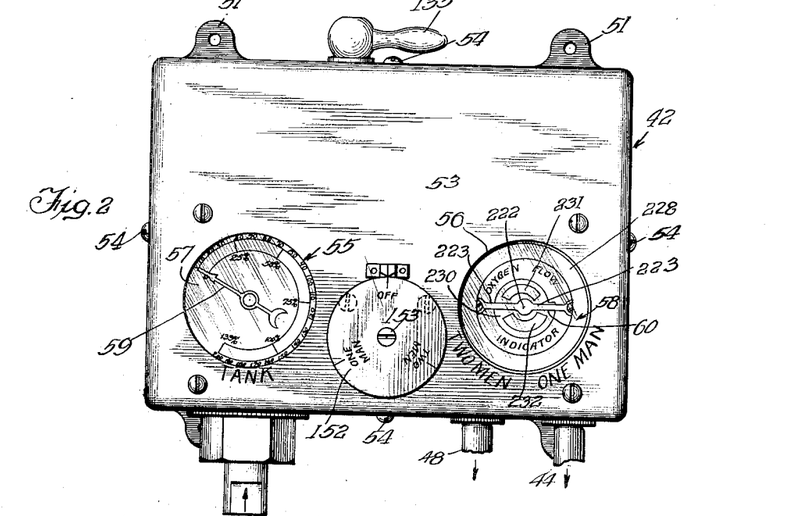
Fig. 2 is side elevation of the same.
Figure 5:
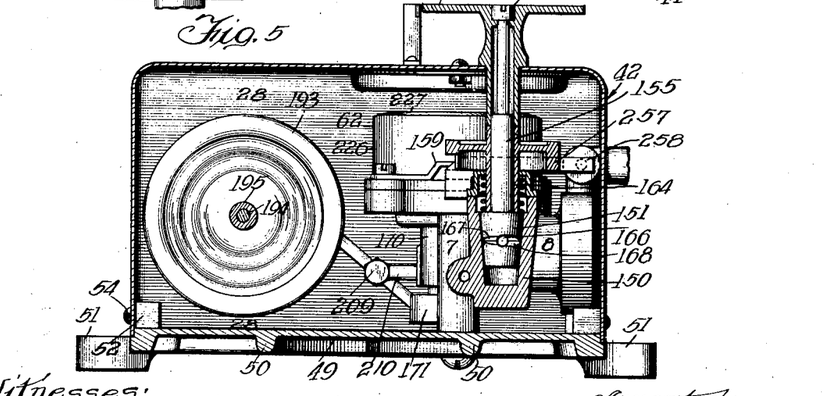
Fig. 5 is a vertical section on the line 5—5 of Fig. 4.
Figure 6:
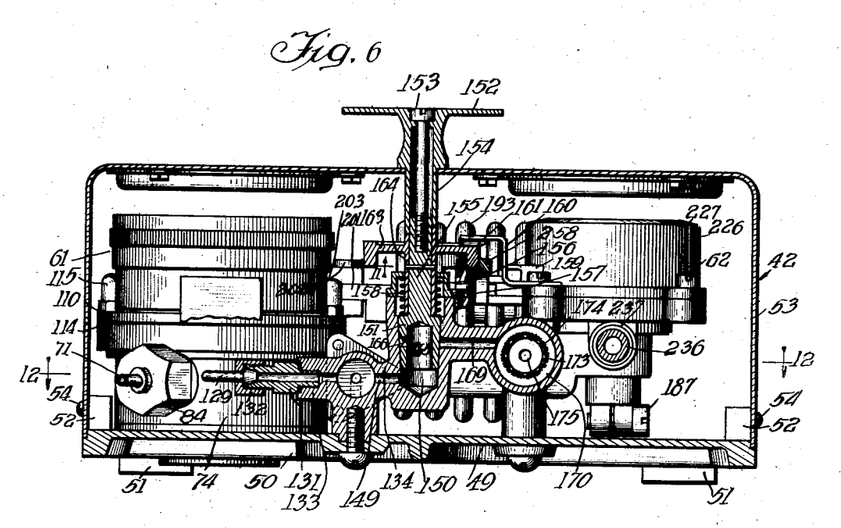
Fig. 6 is a horizontal section on the line 6—6 of Fig. 4.
Figure 7:
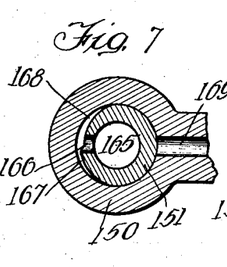
Figs. 7, 8 and 9 are vertical sections, on an enlarged scale on the line 7—8 of Fig. 5 showing the adjustment of the controlling valve for one or two persons.
Figure 8:
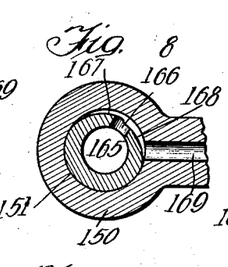
Figure 9:
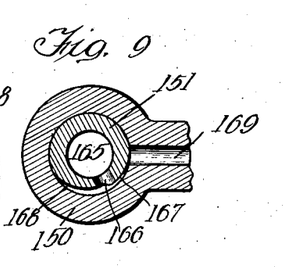
Figure 10:
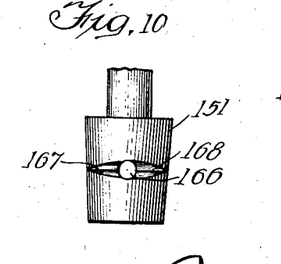

Referring now to Figs. 2, 4 to 9 and 12, the passage 149 from the full flow valve casing leads to the "Men-control" valve casing 150, which casing has the truncated conical seat for the correspondingly shaped body 151 of the valve, the position of which body is controlled by the disk 152, see Fig. 2, which is marked with three indications, "Off," "One man" and "Two men," to indicate the three positions to which the valve is moved. A screw bolt 153 is extended down through the tubular extension 154 of the disk 152, which passes down through an aperture in the casing, and the threaded bottom of the bolt is screwed into the threaded stem 155 of the valve body 151. A cap 156 secured by the screw 157 on the top of the casing 150 serves to hold the helically coiled expanding spring 158 pressing the valve body 151 into firm engagement with its seat. To accurately position the valve in any one of the three positions indicated, I secure upon ears of the valve casing 148 by the screws which unite the various members thereof the extended base 159 (see Fig. 4), of a leaf spring 160 which is of the general shape of a capital Z in horizontal cross section, and has the angular detent projection 161 formed on the end thereof and adapted to engage with any one of the three correspondingly shaped recesses 162 formed in the rim of the disk 163 which has the tubular central portion 164 thereof pinned to the stem 155. The valve body 151 has the central passage 165 extending up through the bottom thereof, and connected by the horizontal port 166, as best seen in Figs. 7, 8 and 9, with two tapering grooves 167 and 168 respectively, the action of the valve being as follows: When the indicating disk 152 is turned to the "Off" position, the valve is in the position shown in Fig. 7, where the passage 169 (see Fig. 6), leading from the man-control valve chamber to the strainer chamber 170 is entirely closed, and the apparatus is practically out of commission, unless it should happen that the full flow valve is opened, as otherwise no oxygen can pass. When it is set to the "One-man" valve position, seen in Fig. 9, the smaller tapering groove 167 has its end serving as the connection to the passage 169, and a limited supply of oxygen can reach the passage 169. When the disk 52 is in the "Two-men" position, the parts are in the position shown in Fig. 8, where a larger passage through the tapered groove 168 supplies the passage 169 with twice as much oxygen as in the "One-man" position.

The strainer chamber 170, as best seen in Figs. 6 and 12, is a cylindrical chamber formed in the casting for the various valve chambers, and has its lower end closed by the large cap 171 screwed on to the enlarged lower end of the chamber, with a packing washer 172 interposed to make the closure air-tight. The strainer proper consists of a metallic cylinder 173 secured centrally in the chamber and having suitable perforations therethrough, and surrounded by the fine gauze screen 174 which will have 200 meshes to the inch. The oxygen passing through this screen has any final impurities removed, and passes upward from this screen chamber through the two-angle passage consisting of the vertical portion 175, the horizontal portion 176 and the outwardly extending portion 177, the upper end of said portion 177 terminating in the annular flanged top 178 of the stationary member 179 of the controlling valve, which has the rearwardly extending body portion 180 screwed into the central portion 181 of the generally disk shaped base 182 of the casing 148. The other movable member of the regulating valve consists of a disk 183 which has a centrally located rearwardly extending stem 184, which is pinned to an enclosing sleeve 185, which might be formed integrally therewith. The sleeve 185 has a threaded portion 186 which co-operates with the internally threaded lower end of the member 180, so that as the stem 184 is turned in one direction, clockwise, as it would appear in Fig. 4, the disk 183 is raised from the annulus 178, and thus opens to a greater extent the port formed by the upper end of the passage 177. The co-operation of the annular surface 178 with the under side of the disk 183 produces a very delicately controlled valve and one that cannot stick under any conditions met with in service.

Figure 15:
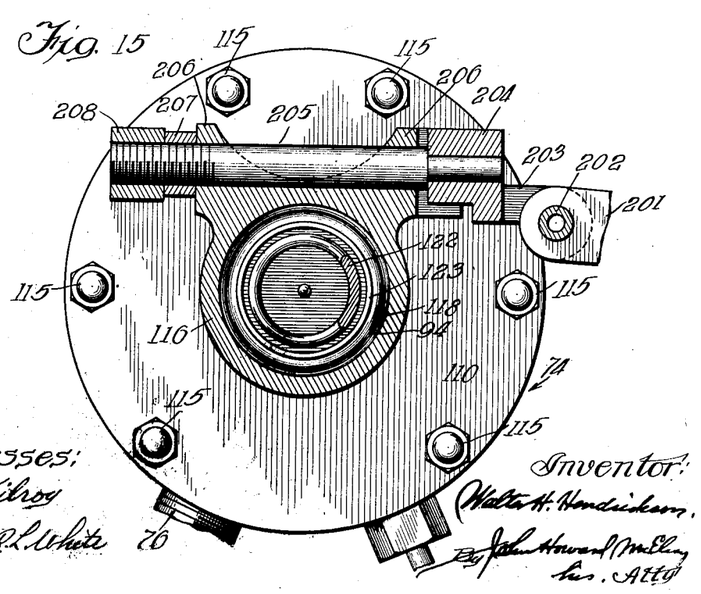
Fig. 15 is a vertical section on the line 15—15 of Fig. 16.
Figure 20:
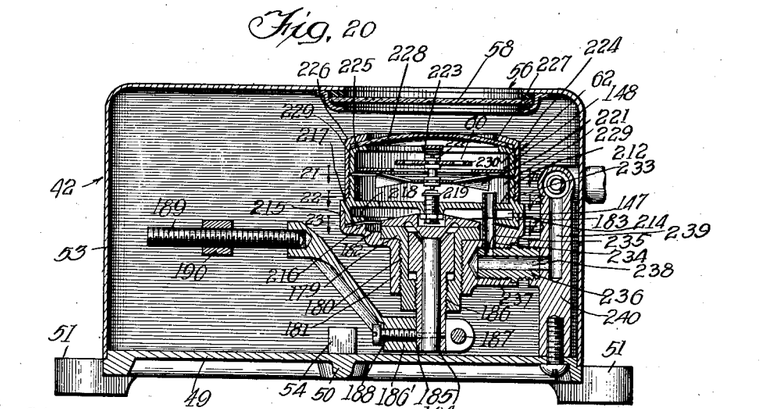
Fig. 20 is a substantially vertical section as seen on the line 20—20 of Fig. 4.
Figure 28:
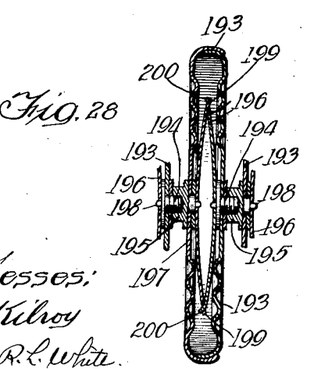
Fig. 28 is a detail in cross section of one of the inner aneroids, as if on the line 28—28 of Fig. 5, but on an enlarged scale.
Figure 29:
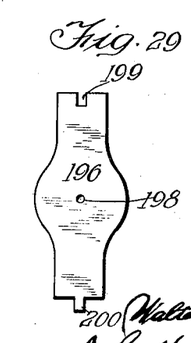
Fig. 29 is an elevation of one of the springs in the aneroid tending to expand the same.

To open this valve proportionally as the aviator rises and the natural oxygen supply is diminishing, I provide a lever 186' seen in Figs. 4 and 20, which has its split lower end clamped on to the lower end of the sleeve 185 by the screw 187, and the action of this screw may be supplemented by the screw 188 threaded through the end of the lever and engaging the sleeve 185. The body of the lever extends diagonally upward and outward, as seen in Fig. 20, and terminates in the vertical threaded portion 189, which may be formed separately from the body of the lever and pinned in a suitable socket formed therein. This threaded extension 189 has screwed thereon the nut 190 which forms an extension pivoted at 191 to the end 192 of a compound aneroid made up of a plurality of aneroid disks 193, which may be constructed as shown in the detail views, Figs. 28 and 29, where each aneroid is seen to be composed of a pair of corrugated disks 193 having their overlapping flanged peripheries sealed together and the adjacent disks of each pair connected by the screws 194 of one disk being threaded into the nut members 195 of the adjacent disks. A pair of bowed leaf springs 196 are placed in the aneroids by the projections 197 on the ends of the screw and nut members entering the central apertures 198 in the leaf springs, which have one end provided with the notch 199 and the other end with the tongue 200 to enter the notch so that the parts can be readily assembled. It will be understood that the springs 196 tend to expand the aneroids, which, however, are evacuated, with the result that the atmospheric pressure tends to keep the springs compressed and as the aviator rises, the atmospheric pressure decreases so that the springs 196 are relieved of some of the atmospheric pressure and operate to expand the aneroid element and thus lengthen the axis thereof. The other end 201 thereof is connected by the pivot 202 with the forked end 203 (see Fig. 15), of a connecting piece 204 in which is secured the end of the screw-threaded rod 205, which extends through the ears 206 formed on the annular portion 116 of the cap 110 of the reducing valve casing. A set nut 207 and a split locking lug 208 projecting up from the top of the cap 110 and clamping the end of the threaded rod 205 serve as an adjustment to position that end of the aneroid element, which position is of course adjusted in the factory. The action of the aneroid on the controlling member is also regulated by the position of the nut 190 on the threaded end 189 of the lever which moves the valve, and by the adjustments shown, which are made in the factory and carefully tested, the rate of feed of the oxygen can be varied with great nicety. To prevent the possibility of the valve members 178 and 183 being drawn together tightly enough to jam when the machine is at sea level, I provide a set screw 209 (see Figs. 4 and 5), which is threaded through the lug 210 suitably located on the base 48 and having its end placed in the path of the lever 186 at a position where when the lever contacts with the same the valve members will not be brought together too tightly. A lock nut 211 on the body of the screw 209 serves to hold it in position.

Figure 3:
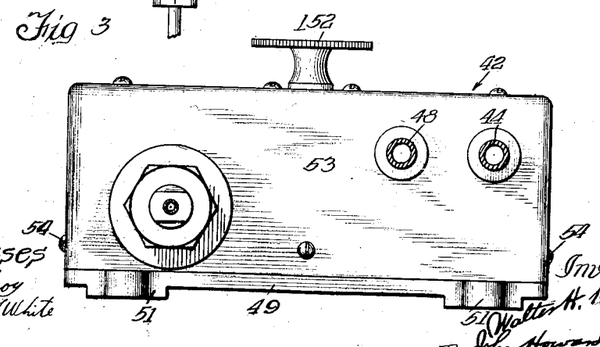
Fig. 3 is a bottom plan view of the same.
Figure 21:
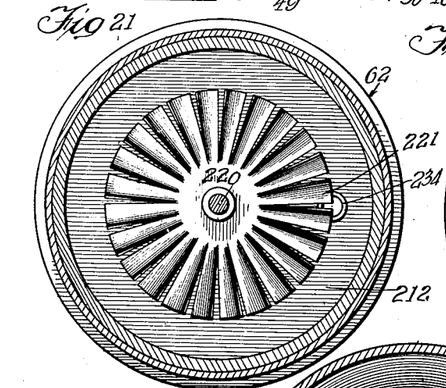
Figs. 21, 22 and 23 are substantially vertical sections, as seen on the lines 21—21, 22—22 and 23—23 of Fig. 20, but on a larger scale.
Figure 22:
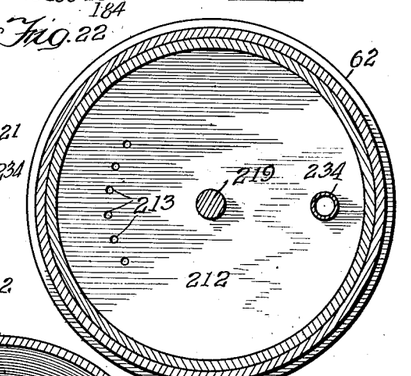
Figure 23:
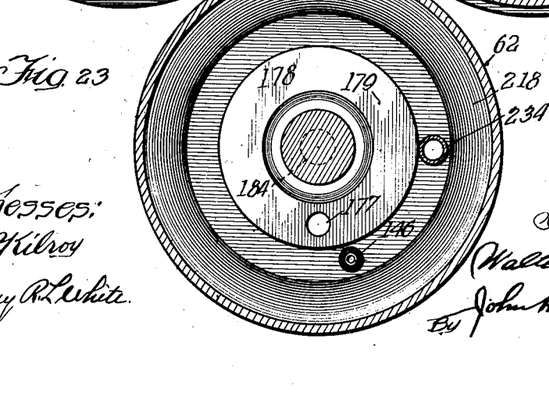

The top of the chamber 147 is formed by the disk 212 (see Figs. 20 and 22), which has the plurality of fine apertures 213 located therein. This disk is provided with a downwardly projecting flange 214, which fits in the upwardly projecting flange 215 of the base piece 182 of the casing 148, and also has the inwardly and preferably outwardly inclined projecting flange 216, which is separated by a packing annulus 217 from the correspondingly shaped surface 218 formed on the top of the interior of the bottom of the valve casing. Centrally located in the disk 212 is a threaded lug 219, the concave upper end of which forms a bearing for the spindle 220 of the flow indicator fan 221, which, as best seen in Fig. 21, is a light metallic disk radially slotted and having wings formed by twisting the portions between the slots. The upper end of the spindle 220 co-operates with a bearing 222 formed in the center of the bar 223 extending across the indicator in the plane of the top of the ring 224 which ring is externally threaded and is provided with the inwardly projecting flange 225. The bar 223 and the dial annulus 223ª are supported on the top of a pair of cylindrical posts 212ª secured on the outer face of the disk 212 by the screws 212ᵇ passed through the ends of the bar 223, the annulus 223ª, the hollow posts 212ª and screwed into the disk 212, as seen in Fig. 3. An outer ring 226 is internally threaded and is provided with an inwardly projecting flange 227 which serves to clamp the crystal 228 between itself and the flange 225 when the annulus 224 is screwed in place, after which the annulus 226 is screwed down on the upwardly projecting flange 229 of the disk 212. The construction thus described makes an air-tight casing within which the regulating valve is mounted, so that if there should be any leakage from the valve, the oxygen does not escape into the atmosphere, but is still confined in the casing from which it is led to the aviator by the passages to be described.

Secured on the spindle 220 is a light metal disk 230, best seen in Fig. 4, which has its periphery in the outline of a spire, and which is provided with a pair of eccentrically located recesses or different colored or shaded portions 231 and 232. As the oxygen rises through the apertures 213, it engages the blades 221 of the fan and rotates the spindle at a rate that corresponds with the amount of oxygen flow, and I have found that at a high rate of speed, the ordinary pointer becomes invisible, and the aviator cannot tell whether or not the fan is rotating. With the construction described, there is an apparent movement toward and from the periphery of the disk of the portions 231 and 232 that makes a visible indication of the rotation of the fan no matter how great the speed, so that the aviator can always be certain whether or not the oxygen is flowing.

Figure 26:
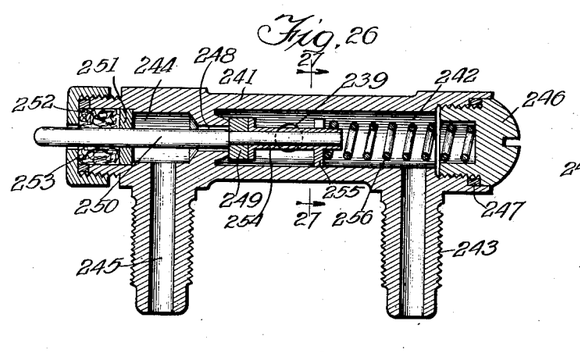
Fig. 26 is a detail in vertical section as seen on the line 26—26 of Fig. 4, but on an enlarged scale.
Figure 27:
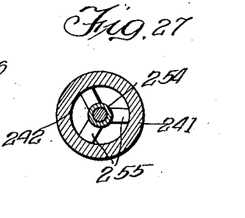
Fig. 27 is a detail in section on line 27—27 of Fig. 26.

From the chamber 233, above the disk 212, the oxygen passes down through the pipe 234 through the aperture 235 in the connection 236 screwed into the socket 237 of the central extension 181 of the bottom of the valve and oxygen flow indicator casing. A vertical passage 238 through the connection leads to a horizontal passage 239 in the outwardly projecting stem portion 240 of the "Two men" valve casing, seen in Figs. 12, 20 and 26. The horizontal longitudinally extending barrel 241 of the same is seen in cross section in Fig. 26 and the channel 239 opens into the main passage 242 of the valve, which has extending therefrom the nipple 243 to which the tube 44 for the single aviator is attached. Located at the other end and connected with the passage 244 is the nipple 245 which is connected to the pipe 48 for the second man, and it will be understood that these nipples 243 and 245 project downwardly through apertures in the sides of the main casing 53 and have the tubes secured thereto. The end of the passage 242 is closed by the plug 246 screwed into the same and provided with the washer 247 to make the same air-tight. The two passages 242 and 244 are connected by the reduced passage 248, the end adjacent to the passage 242 being closed when the apparatus is set for one man by the valve 249, which is preferably composed of bakelite, and is secured on the reduced end of the valve stem 250, the large end of which extends through the passage 244 and through a guide ring 251 in the end thereof, through the packing 252 and through the stuffing nut 253 by which the packing is secured in place and the valve made substantially air-tight. The reduced inner end of the valve stem 250 has secured thereon the sleeve 254, which has near one end thereof the three radial arms 255 co-operating with the walls of the chamber 242 to center the valve, and a helically coiled expanding spring 256 interposed between the radial arms 255 and the apertured end of the plug 246 holds the valve 249 normally seated and closing the passage 248.

Figure 11:
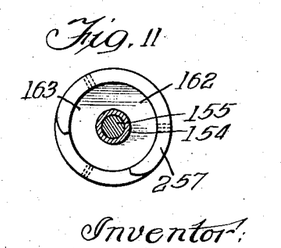
Fig. 11 is a detail in vertical section as seen on the line 11—11 of Fig. 6, showing the cam for opening the valve for the second person.

Referring to Figs. 4, 6 and 11, it will be seen that the under side of the disk 162 has formed on the periphery of about two-thirds of it the rearwardly projecting flange 257, which, when the men-control valve is set to the "Two men" or "Off" position, engages the central portion of a lever 258, best seen in Figs. 4 and 5, which is fulcrumed at 259 on the side of the controlling valve and oxygen flow indicator casing, and has its outer end in contact with the exposed end of the valve stem 250, moving said stem inwardly so as to unseat the valve 249 and make the increased supply of oxygen available to the second man whose inhaler is connected with the nipple 245, as previously described.

By the mechanism heretofore described, it will be evident that with the apparatus properly adjusted, an amount of oxygen can be supplied to one or two men which shall be in the proper proportion to supply the deficit resulting from the higher altitude to which the aeroplane ascends, and I have found by the severest tests that the aforesaid apparatus will co-operate successfully and accurately and certainly under all conditions of service to be met with.

Referring now more especially to Figs. 30 to 36, the inhaler 47 is of the general pocket shape shown, and has at its larger opening the flange 260 which is intended to give the necessary rigidity to the soft rubber of which the body of the inhaler is composed to cause it to maintain its shape over the nose of the aviator which is adapted to fit therein. The side pieces 46 previously referred to are composed of thin metallic strips of brass or some similar metal which can be bent to the necessary shape to fit on the face of the aviator, and having their rear ends terminating in the loops 261 to one of which is secured one end of the elastic band 262, the other end of which passes through the other loop 261 and is secured to the buckle 263 by the movement of which the band can be lengthened or shortened as may be necessary to secure a fit that will hold the inhaler snugly and securely in place. The side pieces 46 are preferably made of a single piece of metal, being connected across the front of the inhaler by the wider portion 264, through which extends a thimble 265 having its inner end screwed into an annular flange 266 formed in the piece 264. The front end of the thimble is closed except for the semi-circular portion 267 on the under side, which is cut away, and which can be closed, when desired, by the circular valve member 268 pivoted to the thimble by the pin 269 and having the semi-circular flange portion 270 adapted to cover and close the aperture 267 when desired. An operating lever or thumb piece 271 is secured on the valve member 268, and a stop pin 272 co-operating with the edges of the semi-circular flange 270 serves to check the movement of the flange member in either its full open position or in its closed position.

The tube 45, or 45', as the case may be, has its ends secured over a nipple 273 which nipple forms a part of a connection 274 secured to the end of the adjacent strip 46, which strips are preferably covered with a layer 275, of some soft material, such as chamois skin, to protect the face of the aviator from contact with the metallic strips 46. At the other end of the connection 274 is a nipple 276 which is connected by a rubber tube 277 with a nipple 278 formed on the adjacent end of the metallic connection 279, which is conveniently secured to the metallic bar 46. A tubular extension 280 of said connection extends downwardly and inwardly underneath the inhaler 47 and opens by the upwardly extending tube 281 into said inhaler so that the oxygen will be delivered in position to rise directly into the nostrils of the user. At the upper end of the inhaler is a rather large circular aperture 282 which is designed to furnish sufficient air to dilute the oxygen when it is being fed to the aviator at which time the valve 268 is closed. When the aviator is flying at a low level and does not need the oxygen, the valve 268 is open so as to furnish an abundance of air. To permit the air to pass readily down to the nostrils from the aperture 282, I form in the sides of the inhaler 47 and extending down to the tube or nipple 281 a pair of channels 283.

The use of the inhaler will be readily understood, as it will be obvious that it is so shaped as to fit snugly about the nose of the aviator without interfering with his vision and with a minimum of discomfort. When rising to a level where the oxygen is necessary, the valve 268 is closed, and the oxygen rising through the nipple 281 enters the nostrils, and sufficient air is, in the act of breathing, sucked down through the aperture 282 and the channels 283 to mingle with the oxygen and dilute it properly.

While I have herein shown and described my novel inhaler particularly adapted for use with the oxygen regulating apparatus, I do not herein claim the same but reserve the subject matter thereof for a divisional application.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

Having thus described my invention, what I claim as new and desire to secure by Letters Patent of the United States, is—

1. In an apparatus of the class described, the combination with a valve casing having an outlet and an entrance passage thereto, of a fixed nipple extending from said passage, a diaphragm dividing the casing into two parts, one part being hermetically sealed to prevent variations in atmospheric pressure affecting it, a member moved by the diaphragm carrying a closure for the nipple, and a spring co-operating with the diaphragm and tending to move it to open the nipple.

2. In an apparatus of the class described, the combination with a valve casing having an outlet and an entrance passage thereto, of a fixed nipple extending from said passage, a diaphragm dividing the casing into two parts, one part being hermetically sealed to prevent variations in atmospheric pressure affecting it, a member moved by the diaphragm carrying a closure for the nipple, a spring co-operating with the diaphragm and tending to move it to open the nipple, and means for regulating the tension of the spring.

3. In an apparatus of the class described, the combination with a valve casing having an outlet and an entrance passage thereto, of a fixed nipple extending from said passage, a diaphragm dividing the casing into two parts, one part being hermetically sealed to prevent variations in atmospheric pressure affecting it, a member moved by the diaphragm carrying a closure for the nipple, a spring co-operating with the diaphragm and tending to move it to open the nipple, and means for regulating the tension of the spring operable from the exterior of the casing without exposing the sealed chamber to atmospheric pressure.

4. In an apparatus of the class described, the combination with a valve casing having an outlet and an entrance passage thereto, of a fixed nipple connected to the passage and opening in the casing, a diaphragm dividing the casing in two parts, one part being hermetically sealed to prevent variations in atmospheric pressure from affecting it, a disk secured to the diaphragm in the sealed part, an opposed disk also in said part, an expanding spring interposed between the two disks, and a screw threaded through the casing and engaging the opposed disk.

5. In an apparatus of the class described, the combination with a valve casing having an outlet and an entrance passage thereto, of a fixed nipple connected to the passage and opening in the casing, a diaphragm dividing the casing in two parts, one part being hermetically sealed to prevent variations in atmospheric pressure from affecting it, a disk secured to the diaphragm in the sealed part, an opposed disk also in said part, an expanding spring interposed between the two disks, a screw threaded through the casing and engaging the opposed disk, and a cap closing hermetically the external chamber in which the outer end of the screw terminates.

6. In an apparatus of the class described, the combination with a cylindrical casing body, of a bottom piece for said casing having an inwardly projecting lug with a radial extension to the center, a tubular connection extended through the side of the cylindrical casing and threaded into the lug, and a nipple carried by the extension, there being a passage through the radial extension to connect the tubular connection with the nipple.

7. In an apparatus of the class described, the combination with a cylindrical casing body, of a bottom piece for said casing having a threaded aperture therein, a diaphragm closing the upper end of the casing body, a yoke secured to the inner side of the diaphragm and depending into said body and terminating in the guide lug, and a threaded cap having a central internal recess for the guide lug screwed into said threaded aperture.

8. In an apparatus of the class described, the combination with a casing, of a diaphragm closing one end thereof, a yoke depending from the center of the diaphragm and terminating in an externally and internally threaded cylindrical portion, a closure fitted in the top of the cylindrical portion, a nut threaded into the interior of the cylindrical portion and engaging the closure, and an external member having a guide lug at its lower end screwed on to the cylindrical portion.

9. In an apparatus of the class described, the combination with means for supplying gas under a substantially constant pressure, of a controlling valve, means controlled by the atmospheric pressure for automatically opening said valve wider as the pressure decreases, and vice versa, connections between said supply means and the controlling valve, a by-pass around said controlling valve, and a full flow valve for said by-pass.

10. In an apparatus of the class described, the combination with means for supplying gas under a substantially constant pressure, of a controlling valve, means controlled by the atmospheric pressure for automatically opening said valve wider as the pressure decreases, and vice versa, connections between said supply means and the controlling valve, a by-pass around said controlling valve, and a manually operated full flow valve for said by-pass.

11. In an apparatus of the class described, the combination with means for supplying gas under a substantially constant pressure, of a controlling valve, means controlled by the atmospheric pressure for automatically opening said valve wider as the pressure decreases, and vice versa, a casting containing a chamber for the controlling valve and a conical valve seat, a passage through the casting from the supply means through the bottom of the conical seat to the controlling valve, a second passage in said casing from the center of the conical seat to the controlling valve chamber beyond the controlling valve, a conical valve having a passage through the bottom and the port in its side in the plane of the second passage, and means for rotating the valve to bring the port into and out of register with the second passage.

12. In an apparatus of the class described, the combination with means for supplying gas under a substantially constant pressure, of a plurality of exits for the gas, a passage from the supply means to the exits, and a men-control valve near the supply means and consisting of a valve seat with an exit port therein and a valve body having a port therein and two tapering grooves in its periphery of different depths leading to said port.

13. In an apparatus of the class described, the combination with means for supplying gas under a substantially constant pressure, of a pair of exit ports, a passage from said supply means to the exit ports, a men-control valve in said passage manually operable to increase the possible flow of gas when the valve is in the two-men position, a spring valve in said passage normally closing one of said exit ports, and connections from the men-control valve to the spring valve automatically to open the latter when the men-control valve is in its increased flow position.

14. In an apparatus of the class described, the combination with means for supplying gas under a substantially constant pressure, of a pair of exit ports, a passage from said supply means to the exit ports, a men-control valve in said passage manually operable to increase the possible flow of gas when the valve is in the two-men position, a spring valve in said passage normally closing one of said exit ports, and connections from the men-control valve to the spring valve automatically to open the latter when the men-control valve is in the increased flow position, said connections consisting of a cam on the men-control valve stem and a lever engaged by said cam when in the increased flow position and in its turn engaging and moving the spring valve stem.

15. In an apparatus of the class described, the combination with a men-control valve chamber, of a two-men valve chamber extending at right angles thereto, a spring pressed plunger valve in said two-men valve chamber and having its valve stem projecting therefrom, a valve in the men-control valve chamber having a valve stem, a disk secured on said men-control valve stem, a cam on the disk, and a lever engaged and moved by the cam when the latter is in its operative position and in its turn engaging and moving the two-men valve stem.

16. In an apparatus of the class described, the combination with a men-control valve chamber, of a two-men valve chamber extending at right angles thereto, a spring pressed plunger valve in said two-men valve chamber and having its valve stem projecting therefrom, a valve in the men-control valve chamber having a valve stem, a disk secured on said men-control valve stem, a cam on the disk, a lever engaged and moved by the cam when the latter is in its operative position and in its turn engaging and moving the two-men valve stem, and a leaf spring having a projection engaging the spaced recesses on the disk when the men-control valve is in its various operative positions.

17. In an apparatus of the class described, a two-men valve consisting of a tube having two nipples projecting radially from the inner ends thereof, a central supply port for said tube, a valve seat in said tube between the port and one of the nipples, a valve stem sliding in the tube and having a valve co-operating with said seat, a coil spring in the tube and co-operating with the valve to hold it seated, and a packed aperture for one end of the tube through which the valve stem slides.

18. In an apparatus of the class described, the combination with means for supplying gas under a substantially constant pressure, of a controlling valve, an aneroid element to control automatically the movement of said valve, connections between the supply means and the controlling valve, means for adjusting the position of the aneroid element relative to the controlling valve, said means consisting of a threaded bolt secured against rotation to one end of the aneroid element, a fixed guide screw bolt, a nut on the threaded end adjacent the guide, and a split lug next to the nut having a screw to clamp the bolt in any position to which it is adjusted by turning the nut.

19. In an apparatus of the class described, the combination with means for supplying gas under a substantially constant pressure, of a controlling valve, an aneroid element automatically to control the movement of said valve, a lever connected to the controlling valve to move the same, connections between the supply means and the controlling valve, and means for connecting the aneroid element to the lever at varying distances from its fulcrum.

20. In an aparatus of the class described, the combination with means for supplying gas under a substantially constant pressure, of a controlling valve, an aneroid element automatically to control the movement of said valve, a lever connected to the controlling valve to move the same, connections between the supply means and the controlling valve, and means for connecting the aneroid element to the lever at varying distances from its fulcrum, said means consisting of a nut carried by the aneroid element and screwed on to the threaded end of the lever.

21. In an apparatus of the class described, the combination with a base member, of a pressure reducing valve mounted thereon, a controlling valve also mounted thereon, a passage from the discharge outlet of the pressure reducing valve to the inlet of the controlling valve, and an aneroid element supported by and between the pressure reducing valve casing and the controlling valve.

22. In an apparatus of the class described, the combination with a base member, of a pressure reducing valve mounted thereon, a controlling valve also mounted thereon, a passage from the discharge outlet of the pressure reducing valve to the inlet of the controlling valve, and an aneroid element having one end adjustably mounted on the pressure reducing valve casing and the other end adjustably connected to the controlling valve to vary its degree of action thereon.

23. In an apparatus of the class described, the combination with means for supplying gas under a substantially constant pressure, of a delivery port for the same, a passage connecting the means with the delivery port, a controlling valve in said passage, and means for causing said controlling valve to open as the atmospheric pressure decreases, and vice versa, said controlling valve consisting of a fixed valve seat containing a port, and a co-operating element rotated by said means.

24. In an apparatus of the class described, the combination with menas for supplying gas under a substantially constant pressure, of a delivery port for the same, a passage connecting the means with the delivery port, a controlling valve in said passage, and means for causing said controlling valve to open as the atmospheric pressure decreases, and vice versa, said controlling valve consisting of an annular fixed valve seat containing a port therein with a centrally located and threaded extension, a movable valve member screwed on the extension and having an annular face co-operating with the valve seat, and a lever connected to the movable valve member and to said means.

25. In an apparatus of the class described, the combination with a valve casing having on its interior an annular valve seat provided with an entrance port, of a co-operating valve member concentrically mounted therein and turned to open the valve, an aneroid member connected to the co-operating valve member and acting to turn the same to open it as the atmospheric pressure decreases, and vice versa, and a stop co-operating with the co-operating valve member to limit its closing movement for the purpose described.

26. In an apparatus of the class described, the combination with a valve casing having in its interior an annular valve seat provided with an entrance port, of a co-operating valve member concentrically mounted therein and turned to open the valve, a partition disk in the valve casing, a rotary fan concentrically journaled in the casing above the partition disk, and a series of apertures in the partition disk beneath the blades of the fan.

27. In an apparatus of the class described, the combination with means for supplying gas under a substantially constant pressure, of a delivery port for the same, a passage connecting the means with the port, means for regulating the rate at which the gas is delivered to the port, a fan in the passage rotated by the flow of the gas therethrough, and an indicator disk rotating with the fan and having eccentrically located markings thereon for the purpose described.

28. In an apparatus of the class described, the combination with means for supplying gas under a substantially constant pressure, of a delivery port for the same, a passage connecting the means with the port, means for regulating the rate at which the gas is delivered to the port, a fan in the passage rotated by the flow of the gas therethrough, and an indicator disk rotating with the fan and having its perimeter in the shape of a spiral and markings thereon with their sides extending parallel to the perimeter.

29. In an apparatus of the class described, the combination with a cylindrical casing having an inwardly directed flange at one end, of a crystal engaging the flange at its edge, an annulus screwed into the casing and having an inwardly directed flange engaging the other side of the crystal, a cross piece with a jewel bearing at its center supported within the annulus, a disk screwed in the bottom of the casing, a jewel bearing stud screwed through the center of the disk, and a fan having the ends of its shaft in the bearings.

30. In an apparatus of the class described, the combination with a rectangular base member, of a supply connection at one corner of the base, a pressure gauge associated therewith at the same corner, a pressure reducing valve at an adjacent corner, passage connections between the supply and the reducing valve, a controlling valve and a flow indicator casing located at the other corner adjacent the said connection, and an aneroid element between the pressure reducing valve and the controlling valve.

In witness whereof, I have hereunto set my hand and affixed my seal, this 17th day of March, A. D. 1919.

WALTER H. HENDRICKSON. [L. S.]

Witness:
JOHN HOWARD McELROY.